United States Patent [19]
Skaggs et al.

[11] Patent Number: 6,110,271
[45] Date of Patent: Aug. 29, 2000

[54] METHODS FOR IMPROVED RHEOLOGICAL CONTROL IN CEMENTITIOUS SYSTEMS

[75] Inventors: Bryan Skaggs; Walter Rakitsky, both of San Diego, Calif.; Alain Phyfferoen, Crawley, United Kingdom

[73] Assignee: Pharmacia Corporation, St. Louis, Mo.

[21] Appl. No.: 08/923,325

[22] Filed: Sep. 4, 1997

Related U.S. Application Data

[63] Continuation of application No. 08/573,112, Dec. 15, 1995, abandoned.
[51] Int. Cl.$^7$ .................................................. C04B 24/10
[52] U.S. Cl. .......................... 106/804; 106/696; 106/729; 106/730; 106/779; 106/790; 106/823
[58] Field of Search ................................. 106/696, 729, 106/730, 779, 790, 804, 823

[56] References Cited

U.S. PATENT DOCUMENTS

| | | | |
|---|---|---|---|
| 4,041,234 | 8/1977 | Maske | 536/114 |
| 4,069,062 | 1/1978 | Bürge | 106/93 |
| 4,342,866 | 8/1982 | Kang et al. | 536/119 |
| 4,462,836 | 7/1984 | Baker et al. | 106/92 |
| 4,487,864 | 12/1984 | Bermudez et al. | 524/2 |
| 4,963,668 | 10/1990 | Allen et al. | 536/114 |
| 4,981,520 | 1/1991 | Hoskin et al. | 106/208 |
| 5,004,506 | 4/1991 | Allen et al. | 106/729 |
| 5,175,277 | 12/1992 | Rakitsky et al. | 536/114 |
| 5,175,278 | 12/1992 | Peik et al. | 536/123 |
| 5,180,430 | 1/1993 | Gartner et al. | 106/730 |
| 5,207,826 | 5/1993 | Westland et al. | 106/163.1 |
| 5,290,768 | 3/1994 | Ramsay et al. | 514/54 |
| 5,447,197 | 9/1995 | Rac et al. | 166/293 |

FOREIGN PATENT DOCUMENTS

| | | |
|---|---|---|
| 0290198 | 4/1988 | European Pat. Off. . |
| 0507419A1 | 4/1988 | European Pat. Off. . |
| 0405306A1 | 6/1990 | European Pat. Off. . |
| 1068886 | 6/1964 | United Kingdom . |
| 2080812 | 7/1981 | United Kingdom . |
| 2252103A | 10/1991 | United Kingdom . |

OTHER PUBLICATIONS

"Portland Cement, Composition, Production and Properties", by G.C. Byc, Pergamon Press, New York, London, Ontario, Paris, Oxford (1983) no month.
"Effects of Antiwashout Admixtures on Fresh Concrete Properties", by Kamal Henri Khayat, published in the ACI Structural Journal, Title No. 92–MIS, Mar.–Apr. 1995.
Applications of Reheological Modifiers and Superplasticizers in Cementitious Systems, Superplasticizer sand Other chemical Admixtures in Concrete, Proceedings of 4th CANMET/ACI International Conference, Montreal, Canada, Oct. 1994.
The Effect of Polysaccharide Rheology on Highly Workable and Self–Levelling Systems; Phyfferoen, A., (no date).
Lightweight Concrete for Prefabricated Modular Housing, Virgilo A. Ghio and Guillermo Thenoux (no date).
Proceedings of Symposium on the Applications and Modifications of Industrial Polysaccharides held Apr. 1987, entitled "Industrial Polysaccharides Genetic Engineering, Structure/Property Relations and Applications", edited by Manssur Yalpani, Elsevier Science Publishers B.V., 1987 no month.
"Polymers in Concrete", by Satish Chandra, Dr. Ing. And Yoshihiko Ohama, Ph.D., published by CRC Press, Boca Raton, Ann Arbor, London, Tokyo (1994) no month.
"Concrete Admixtures Handbook—Properties, Science, and Technology", edited by V.S. Ramachandran, Noyes Publications, Park Ridge, New Jersey, USA (1984) no month.
"Design and Control of Concrete Mixtures", Thirteenth Edition, by Steven H. Kosmatka and William C. Panarese, Portland Cement Association, 5420 Old Orchard Road, Skokie, Illinois (1988) no month.
"Masonry: Design and Construction, Problems and Repair", Chapter entitled Evaluation of Injectable Cementitious Grouts for Repair and Retrofit of Masonry by R.H. Atkinson and M.P. Schuller, STP 1180, John M. Melander and Lynn R. Lauersdorf, editors, copyright 1993 in American Society for Testing and Materials no month.

(List continued on next page.)

*Primary Examiner*—Anthony Green
*Attorney, Agent, or Firm*—Fitzpatrick, Cella, Harper & Scinto

[57] ABSTRACT

In accordance with the present invention, a microbial polysaccharide having the features characteristic of S-657 has been found to be effective to improve the rheological properties of a variety of cementitious systems. Thus, the addition of a small, but effective amount of S-657 to such cementitious systems as portland cement, self-leveling grouts, fresh or saltwater oil well cement slurries, microfine cements, and the like, gives rise to substantial improvements in such properties as bleed, flow resistance, fluid loss control, and the like. S-657 addition provides enhanced rheological control in a variety of cementitious systems. In addition, S-657 provides a number of advantages relative to prior art systems, including improved free water and sedimentation control, as well as reduced fines loss during underwater placement. This unique biogum has been shown to enhance the stability of highly diluted microfine cementitious systems, and enhance the flow and workability of superworkable and self-leveling pastes. The homogenous set cement resulting from the introduction of S-657 into cementitious systems promotes bond strength and eliminates the need for vibrated concrete. Efficient free or bleed water control eliminates unsightly vugs or voids adjacent to the form work and thus enhances the appearance of the finished concrete. This highly efficient polymer provides additional benefits as well, such as, for example, enhanced color delivery in pigmented concrete and stabilized bubble entrapment in so called foamed or cellular cement systems. When used in sprayable cementitious systems, S-657 reduces rebound and sag.

34 Claims, 1 Drawing Sheet

OTHER PUBLICATIONS

"Dam Foundation Grouting", by Ken Weaver, published by American Society of Civil Engineers, New York, New York (1991) no month.

"The Condensed Chemical Dictionary", Eighth Edition, p. 183, Revised by Gessner G. Hawley, formerly Executive Editor, Reinhold Publishing Corporation, Coeditor, Encyclopedia of Chemistry, Van Nostrand Reinhold Company [no date].

"The New American Desk Encyclopedia", by Elsevier Copyrights Management S.A., Lausanne, Switzerland (1977) no month.

"Cement and Mortar Technology and Additives, Developments Since 1977", Edited by M.H. Gutcho, Noyes Data Corporation (1980) no month.

"Industrial Gums—Polysaccharides and Their Derivatives", Third Edition, Chapter 8, pp. 205–209, edited by Roy L. Whistler and James N. BeMiller, Academic Press, Inc. [no date].

"Materials Science of Concrete IV", article entitled Mechanisms of Superplastification, pp. 91–95, by Etsuo Sakai and Masaki Daimon, Tokyo Institute of Technology, Copyright 1995 the American Ceramic Society no month.

"The Effect of Polysaccharide Rheology on Highly Workable and Self–Levelling Systems", a. Phyfferoen; G. Sworn; R. MacPherson; Kelco International Ltd., Waterfield, Tadworth, UK (1995) no month.

"Production Methods of Workability of Concrete", Chapter 41 entitled "A Model for Self–Compacting Concrete" and Chapter 23 entitled "Experimental Research on the Material Properties of Super Flowing Concrete", Proceedings of the International RILEM Conference held Paisley, Scotland, Jun. 3–5, 1996, edited by P.J.M. Bartos, D.L. Marrs, and D.J. Cleland, Published in 1996 by E & FN Spon no date.

"Statistical Models to Predict Flowability, Washout Resistance and Strength of Underwater Concrete", Production Methods and workability of Concrete, Edited by P.J.M. Bartos, D.L. Marrs and D.J. cleland, Published in 1966 by E & FN Spon, 2–6 Boundary Row, London no month.

"Chemical Abstracts", vol. 126, No. 11, A publication of Chemical Abstracts Service published weekly by The American Chemical Society, Mar. 17, 1997.

"Chemical Abstracts", published by the American Chemical Society, vol. 92, Jan. 7–Jan. 21 (Abstracts 1–22821) 1980.

"Cementing", Monograph vol. 4 Henry L. Doherty Series, Dwight K. Smith, Cementing Coordinator Halliburton Services, Henry L. Doherty Memorial Fund of AIME, Society of Petroleum Engineers of AIME (1976) no month.

"Carbohydrate Research", 139 (1985) pp. 217–223, Elsevier Science Publishers B.V., Amsterdam—Printed in The Netherlands no month.

"Concrete Structure, Properties, and Materials", by P. Kumar Mehta, University of California, Prentice–Hall, Inc., Englewood Cliffs, New Jersey (1986) no month.

"The Chemistry of Cement and Concrete", Third Edition, F.M. Lea, KT, C.B., C.B.E., D.SC., F.R.I.C., Formerly Director of Building Research, Edward Arnold (Publishers) Ltd., (1970) no month.

Derwent Abstract: European Patent Office 94–290731 [36]; (SHIE) Shinetsu Chem Ind Co Ltd.; Cement mortar compsn for joining interior and exterior tiles—contg cement, aq cellulose ether soln and dextrin to retard initial and fina setting times (Aug. 1994).

Research Disclosure, No. 354, Oct. 1, 1993, p. 672 XP000412828 "Blends of Microbial Polysaccharides with Cellulosic Derivatives for Cementitious Applications".

Industrial Polysaccharides: Genetic Engineering, Structure/Property Relations and Applications, 1987, no month, Edited by M. Yalpani, Elsvier Science Publishers B.V. Amsterdam, NL, pp. 187–206, XP000670613, R. Moorhouse: "Structure/Property Relationships of a Family of Microbial Polysaccharides".

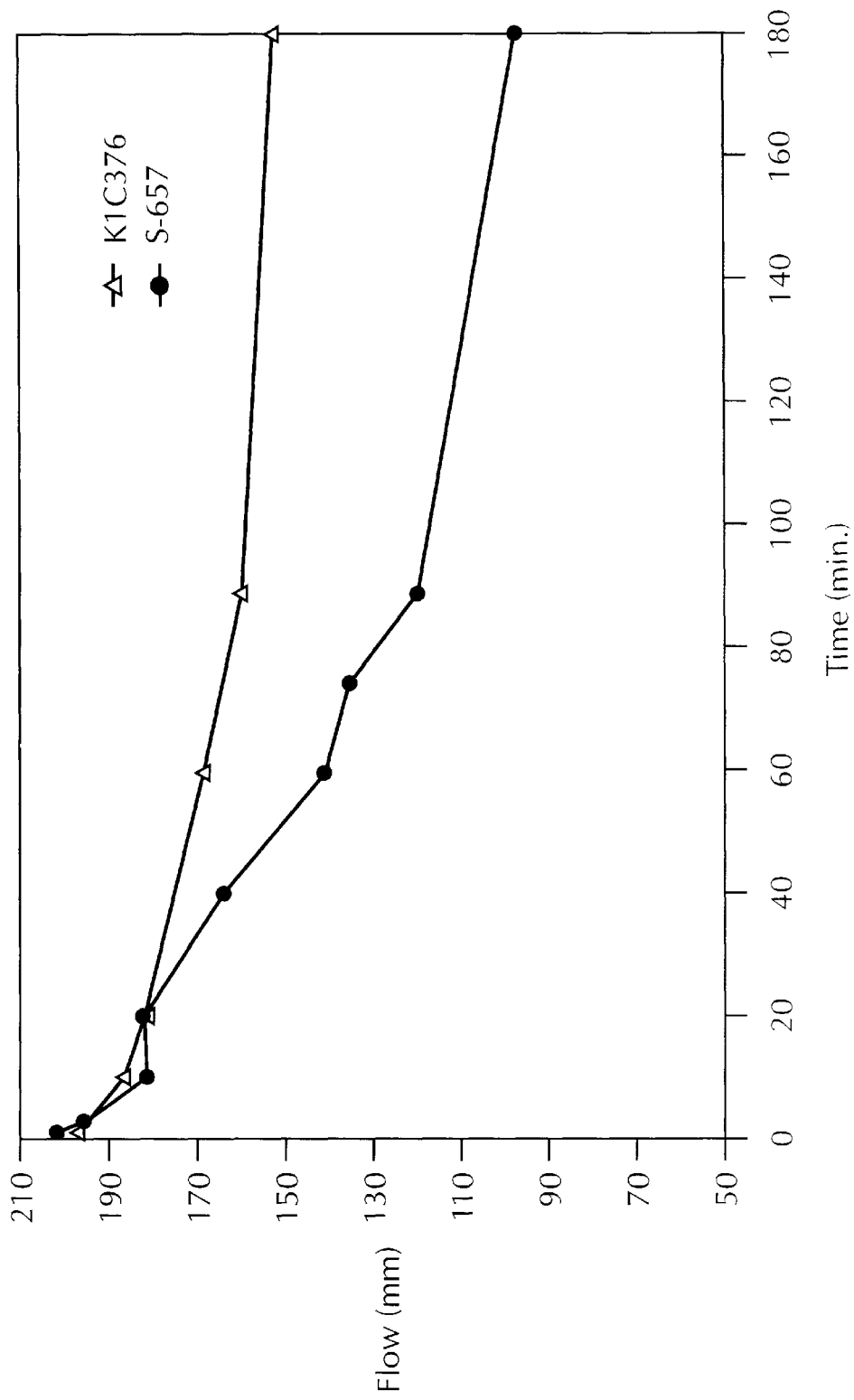

METHODS FOR IMPROVED RHEOLOGICAL CONTROL IN CEMENTITIOUS SYSTEMS

This application is a continuation, of application Ser. No. 08/573,112 filed Dec. 15, 1995, abandoned.

FIELD OF THE INVENTION

The present invention relates to novel cementitious systems having improved rheological properties, as well as methods for improving the rheological properties of prior art cementitious systems. In a particular aspect, the invention relates to improved highly flowable, self-leveling grout formulations. In another aspect, the invention relates to methods of reducing bleed and sedimentation in highly fluid cement formulations. In a further aspect, the invention relates to methods to improve the performance of fresh or saltwater oil well cement slurries. In yet another aspect, the invention relates to modified fresh or saltwater oil well cement slurries. In still another aspect, the invention relates to improved microfine cement formulations containing one or more dispersants. In a still further aspect, the invention relates to methods to improve the rheological properties of colloidal cements.

BACKGROUND OF THE INVENTION

The majority of buildings are constructed with cementitious materials or systems that vary widely in composition, design, and end use. As used herein, the term "cementitious system" refers to materials which, when mixed with an aqueous medium, bind, or impart an adhesive or cohesive behavior. Some examples include portland cements that are produced by burning limestone and clay, natural and artificial pozzolanic cements (pozzolanic materials react with lime to form calcium silicate hydrates), slag cements, combinations of portland cement and granulated blast furnace slag, refractory cements (e.g., rapid set cements containing primarily calcium aluminate compounds, such as, for example, Ciment Fondu produced by Lafarge, and Luminite, produced by Lehigh Cement Company), gypsum, expanding cements, fly ash, as well as so called "mud to cement" systems, whereby a drilling mud is converted into a cementitious material during the completion process of certain subterranean wellbores, and the like. See, for example, Bye, G. C., "Portland Cement, Composition, Production and Properties", Pergamon Press, New York, London, Ontario, Paris, Oxford (1983); Smith, Dwight K., "Cementing", Monograph Volume 4, Published by The Society of Petroleum Engineers, New York and Richardson, Tex. (1987).

Fresh cement paste is composed of cementitious material and water, while fresh concrete paste is comprised of a wide range of materials such as portland cement, fly ash, silica fume, sand, aggregate, i.e., small rocks and the like. Mixing, transporting, and placing the fresh concrete presents a number of challenges as the paste must remain highly fluid and ideally should provide homogenous transport of all particles. This problem is compounded because excessive water is frequently added to the mixture in efforts to enhance flow. The hydration of portland cement, for example, typically requires some 25–28 percent water basis weight of cement (BWOC). Unfortunately, excessive water can lead to a number of problems, such as, for example, bleed, sedimentation, reduced strength and durability, and poor bonding to structural reinforcement members.

Two types of materials used in admixture with cementitious formulations to enhance fresh paste flow, without the need to employ additional water, are water reducers and superplasticizers. However, admixtures containing either material can induce excessive bleed and sedimentation. As used herein "bleed" refers to free water collection on the surface, while "sedimentation" refers to the segregation of particle size whether during placement, or static. Excessive bleed can cause many problems, such as, for example, by reducing the durability and strength of the desired bond. In some cases, bleed water channels form on horizontal structural components, thereby reducing bond strength and creating corrosion sites. Aggregate segregation reduces the surface wear properties causing increased maintenance costs.

Recent technologies have provided a new class of cement additives, the so called rheological modifiers, or viscosity modifying agents (VMA). This class of additives is usually water-soluble polymers and function by increasing the apparent viscosity of the mix water. This enhanced viscosity facilitates uniform flow of the particles and reduces bleed, or free water formation, on the fresh paste surface. Underwater concrete placement designs frequently require a polymer admixture to reduce fines loss during placement (Khayat, Kamal Henri, "Effects of Antiwashout Admixtures on Fresh Concrete Properties", Published in the ACI Structural Journal, Title No. 92-M18, March–April, (1995)). Unfortunately, this also increases the resistance of the fresh cement paste to flow and may induce excessive frictional pressure during conveyance.

Accordingly, there is still a need in the art for methods to treat the above-described problems of bleed, sedimentation, flow resistance, etc, encountered with existing cementitious formulations.

BRIEF DESCRIPTION OF THE INVENTION

In accordance with the present invention, it has been discovered that a microbial polysaccharide having the features characteristic of S-657 is effective to improve the rheological properties of a variety of cementitious systems. Thus, the addition of a small, but effective amount of S-657 to such cementitious systems as portland cement, mud to cement system, colloidal cement, self-leveling grouts, fresh or saltwater class H oil well cement slurries, microfine cements, and the like, gives rise to substantial improvements in such properties as bleed, flow resistance, fluid loss control (i.e., water retention), and the like.

S-657 addition provides enhanced rheological control in a variety of cementitious systems. In addition, S-657 provides a number of advantages relative to prior art systems, including improved free water and sedimentation control, as well as reduced fines loss during underwater placement. This unique biogum enhances the stability of highly diluted microfine cementitious systems, and enhances the flow and workability of superworkable and self-leveling pastes. The homogenous set cement resulting from the introduction of S-657 into cementitious systems promotes bond strength and eliminates the need for vibrated concrete. Efficient free or bleed water control eliminates unsightly vugs or voids adjacent to the form work and thus enhances the appearance of the finished concrete. This highly efficient polymer provides additional benefits as well, such as, for example, enhanced color delivery in pigmented concrete and stabilized bubble entrapment in so called foamed or cellular cement systems. When used in sprayable cementitious systems, S-657 reduces rebound and sag.

BRIEF DESCRIPTION OF THE FIGURE

FIG. 1 shows the flow as a function of time for cementitious systems containing one of two polymer additives, i.e., S-657 or welan gum.

DETAILED DESCRIPTION OF THE INVENTION

In accordance with the present invention, there are provided improved cementitious systems containing one or more viscosity modifying agents (VMAs), comprising a formulation the improvement comprising including in such system a rheology improving amount of a microbial polysaccharide having the features characteristic of S-657.

S-657 is described in detail in U.S. Pat. No. 5,175,278, the entire contents of which are hereby incorporated by reference herein. S-657 is a microbial polysaccharide produced under carefully controlled aerobic fermentation conditions by the organism Xanthomonas ATCC 53159. The primary structure comprises a linear tetrasaccharide repeat unit of D-glucose, D-glucuronic acid, D-glucose, and L-rhamnose. This repeat unit has a side chain composed of two rhamnose substituents linked through O-3 on the backbone 4-linked glucose residue (Moorhouse, Ralph, Structure/Property relationships of a Family of Microbial Polysaccharides, *Industrial Polysaccharides: Genetic Engineering, Structure/Property Relations and Applications*, Elseivier Science Publishers B.V., Amsterdam (1987)). In contrast, welan gum (S-130), has the same backbone repeat unit with a single side substituent. The side sugar can be either L-rhamnose or L-mannose.

It is presently believed that S-657 forms an extended, intertwined 3-fold left-handed double helix with a molecular weight estimated to be in excess of two million. This structure produces a molecule with excellent heat stability, extremely high viscosity at low shear rates, and salt tolerance in high pH calcium environments.

As used herein, VMAs refer to water soluble polymers such as, for example, cellulose ethers (e.g., hydroxyethyl cellulose (HEC), hydroxyproplmethyl cellulose (HPMC), sodium carboxymethyl cellulose (CMC), carboxymethylhydroxyethyl cellulose (CMHEC), and the like); synthetic polymers (e.g., polyacrylates, polyvinyl alcohol (PVA), polyethylene glycol (PEG), and the like); exopolysaccharides (also known as biopolymers, e.g., welan gum, xanthan, rhamsan, gellan, dextran, pullulan, curdlan, and the like); marine gums (e.g., algin, agar, carrageenan, and the like); plant exudates (e.g., locust bean, gum arabic, gum Karaya, tragacanth, Ghatti, and the like); seed gums (e.g., Guar, locust bean, okra, psyllium, mesquite, and the like); starch-based gums (e.g., ethers, esters, and related derivatized compounds). See, for example, Shandra, Satish and Ohama, Yoshihiko, "Polymers In Concrete", published by CRC press, Boca Ration, Ann Harbor, London, Tokyo (1994).

Cementitious systems contemplated for use in the practice of the present invention include portland cements, pozzolanic cements, slag cements, calcium aluminate cements, gypsum cements, expanding cements, ceramics, fly ash, and the like, as well as mixtures of any two or more thereof.

Rheology improving amounts of S-657 contemplated for use in the practice of the present invention fall in the range of about 0.001 up to 1 wt %, based on the total weight of the dry cementitious system. Presently preferred amounts of S-657 contemplated for use in the practice of the present invention fall in the range of about 0.002 up to 0.5 wt %.

In accordance with another embodiment of the present invention, there are provided novel formulations comprising:
 a cementitious system,
 a dispersing agent, and
 a microbial polysaccharide having the features characteristic of S-657.

Optionally, the above-described formulations exist as aqueous suspensions, i.e., the above-described formulations further comprise in the range of about 0.001 up to 3 wt % water, based on the total weight of the formulation. Presently preferred amounts of water contemplated for use in the practice of the present invention fall in the range of about 0.002 up to 1 wt %.

Dispersing agents contemplated for use in the practice of the present invention include water reducers and superplasticizers. As used herein, the term "water reducer" means an admixture capable of reducing mix water concentration between 10 and 15% while maintaining flowability of the same system with no added water reducer. As used herein, the term superplasticizer (which is sometimes synonymous with "high range water reducer" (HRWR), or in the case of oil well applications may be referred to as a "dispersant") differs from normal water reducers as they are capable of reducing water contents up to 30% while providing similar flow behavior.

Superplasticizers have found a number of uses in addition to reducing water, such as, for example, to impart improved workability, to impart ease of conveyance, to enable the use of reduced water content in fresh paste (thereby providing increased durability). Superplasticizers are broadly classified into four groups, i.e., sulfonated naphthalene-formaldehyde condensate (SNF; these compounds are manufactured by a number of companies including, but not limited to, Handy Chemical (Disal), Boremco (Borem), Rohm and Haas (Tamol), and Henkel (Lomar)); sulfonated melamine formaldehyde condensate (SMF; e.g., compounds manufactured by SKW (Melment) and Handy Chemical (Meladyne)); modified lignosulfonates (MLS; which are commercially available from a number of companies including Georgia Pacific (LIGNOSITE), Borregaard (Vanisperse CB), and Chem-Lig (CA-37)); as well as other high molecular weight esters, such as, for example, sulfonic acid esters, carbohydrate esters, and the like. See, for example, Ramachandran, V. S., "Concrete Admixture Handbook", Properties Science, and Technology, Noyes Publications, Park Ridge, N.J., (1984); Kosmatka, Stephan H. and Panarese, William C., "Design and Control of Concrete Mixtures", Thirteenth Edition, Portland Cement Association, 5420 Old Orchard Road, Skokie, Ill., (1994).

In accordance with yet another embodiment of the present invention, there are provided methods to improve the rheological properties of a cementitious system, said method comprising including in said system a rheology improving amount of a microbial polysaccharide having the features characteristic of S-657.

Rheology improving amounts of S-657 contemplated for use in accordance with the above-described embodiment of the present invention, relating to improving the rheological properties of cementitious systems, fall in the range of about 0.001 up to 1 wt %, based on the total weight of the dry cementitious system. Presently preferred amounts of S-657 contemplated for use in the practice of the present invention fall in the range of about 0.003 up to 0.5 wt %.

In accordance with still another embodiment of the present invention, there are provided improved highly flowable, self-leveling grout formulations, the improvement comprising adding to said formulations a rheology improving amount of a microbial polysaccharide having the features characteristic of S-657.

Injection grouts are composed of cementitious materials and may include portland cement, Pozzolans, silica fume, and fly ash. The water/solid ratios in injection grouts can vary widely, typically ranging from 0.20 to 20 (basis weight of cement). Similarly, the amount of fine sand aggregate can vary widely, typically ranging from 0 up to 200%. Additional components which may be admixed in injection grouts include superplasticizers, gas generating agents such as aluminum powder, viscosity modifying agents (VMA), and the like. A typical system is metered by volume and includes 3 parts sand, 2 parts cement and 1 part water (Atkinson, Richard H. and Schuller, Michael P., "Evaluation of Injectable Cementitious Grouts for Repair and Retrofit of Masonry", Masonry: Design and Construction, Problems and Repair, ASTM STP 1180, John M. Melander and Lynn R. Lauersdorf, Eds., American Society for Testing and Materials, Philadelphia (1993)). Superplasticizers may range from 0 to 5% basis weight of cement. VMA will vary from 0 to 1% basis weight of cement.

Rheology improving amounts of S-657 contemplated for use in accordance with the above-described embodiment of the present invention, relating to improved highly flowable, self-leveling grout formulations, fall in the range of about 0.001 up to 0.5 wt %, based on the total weight of the dry cementitious system. Presently preferred amounts of S-657 contemplated for use in the practice of the present invention fall in the range of about 0.002 up to 0.15 wt %.

In accordance with a further embodiment of the present invention, there are provided methods of reducing bleed and sedimentation in highly fluid cement formulations selected from grout, mortar or concrete formulations, said method comprising adding to said formulation a rheology improving amount of a microbial polysaccharide having the features characteristic of S-657.

Rheology improving amounts of S-657 contemplated for use in accordance with the above-described embodiment of the present invention, relating to reducing bleed and sedimentation in highly fluid cement formulations, fall in the range of about 0.002 up to 0.5 wt %, based on the total weight of the dry cementitious system.

In accordance with a still further embodiment of the present invention, there are provided methods to improve the rheological performance of fresh or saltwater oil well cement slurries, said method comprising adding to said slurry a rheology improving amount of a microbial polysaccharide having the features characteristic of S-657. As used herein, "rheological performance" embraces the flow profile during placement of cementitious systems or so called "spacer fluids" (i.e., fluids designed to separate drilling fluids and cementitious materials), fluid loss control, free water control, sedimentation control, particle transport and suspension, and the like.

Rheology improving amounts of S-657 contemplated for use in accordance with the above-described embodiment of the present invention, related to improving the rheological performance of fresh or saltwater oil well cement slurries, as well as related spacer fluids, fall in the range of about 0.01 up to 0.5 wt %, based on the total weight of the dry cementitious system.

In accordance with yet another embodiment of the present invention, there are provided modified fresh or saltwater oil well cement slurries comprising:
  a fresh or saltwater oil well cement slurry, and
  a microbial polysaccharide having the features characteristic of S-657. The resulting slurry has improved properties, especially improved fluid loss control and substantial elimination of free water formation.

In accordance with still another embodiment of the present invention, there are provided improved microfine cement formulations containing one or more dispersants, the improvement comprising adding to said formulation a rheology improving amount of a microbial polysaccharide having the features characteristic of S-657.

Rheology improving amounts of S-657 contemplated for use in accordance with the above-described embodiment of the present invention, related to improved microfine cement formulations containing one or more dispersants, fall in the range of about 0.01 up to 5 wt %, based on the total weight of the dry cementitious system. Presently preferred amounts of S-657 contemplated for use in the practice of the present invention fall in the range of about 0.01 up to 1 wt %.

Microfine cement formulations contemplated for use in the practice of the present invention are well known in the art. Indeed, the American Concrete Institute (ACI) Committee 552 has unofficially adapted a reference standard of 100% finer than 15 microns to be referred to as ultrafine. The term "ultrafine" is synonymous with "microfine" and "superfine" (see Weaver, Ken, "Dam Foundation Grouting", Published by American Society of Civil Engineers, New York, N.Y., (1991)). Thus, any material which satisfies the above definition of microfine is within the scope of the present invention.

In accordance with a still further embodiment of the present invention, there are provided methods to improve the rheological properties of microfine or colloidal cements, said method comprising adding to said cement a rheology improving amount of a microbial polysaccharide having the features characteristic of S-657. The invention method provides means to extend microfine cements to produce low viscosity, homogeneous flow cementitious materials. In additions, the invention method provides stable, non-settling, non-bleeding, extremely high water/cement ratio grouts.

Rheology improving amounts of S-657 contemplated for use in accordance with the above-described embodiment of the present invention, related to microfine or colloidal cements having improved rheological properties, fall in the range of about 0.001 up to 0.5 wt % in water, based on the total weight of the water.

In accordance with yet another embodiment of the present invention, there are provided novel formulations comprising:
  a cementitious system, and
  a microbial polysaccharide having the features characteristic of S-657.

Optionally, the above-described formulations exist as aqueous suspensions, i.e., the above-described formulations further comprise in the range of about 0.001 up to 3 wt % water, based on the total weight of the formulation. Presently preferred amounts of water contemplated for use in the practice of the present invention fall in the range of about 0.002 up to 1 wt %.

The quantity of S-657 contemplated for inclusion into the above-described formulations typically falls in the range of about 0.001 up to 1 wt %, based on the total weight of the dry cementitious system.

The invention will now be described in greater detail with reference to the following non-limiting examples.

EXAMPLE 1

Performance in Type I Portland Cement

Used in conjunction with water reducers or superplasticizers, the unique molecular features of S-657 provide superb rheological control in fresh cementitious paste as demonstrated in Table 1.

All samples were mixed using 400 grams of tap water and 400 grams of cement. All cement samples were preblended with 6.0 grams (1.5% BWOC, i.e., basis weight of cement) of a sulfonated naphthalene formaldehyde condensate superplasticizer and the desired gum sample. The K1C 376 (available from Kelco, San Diego, Calif. as KELCO-CRETE. KELCO-CRETE is a registered trademark of Kelco, a Unit of Monsanto Company) is a welan gum recovered under specific conditions to assure optimum performance in fresh cement paste. Fann Dial Reading (FDR) is obtained using a Fann 35 R1, B1, FO.2 (following manufacturer's directions, see the Fann Instrument Company, Model 35 Viscometer Instruction Manual, Published by Fann Instrument Co, Houston, Tex.).

TABLE 1

Performance Analysis of K1C 376 and S-657 in Type 1 Portland Cement

| GUM | GUM (%, BWOW[1]) | FDR[2] | FW[3] (%, Vol) |
|---|---|---|---|
| K1C376 | 0.050 | 22 | 22 |
| K1C376 | 0.075 | 29 | 8.3 |
| K1C376 | 0.100 | 39 | 0.0 |
| K1C376 | 0.125 | 49 | 0.0 |
| K1C376 | 0.150 | 61 | 0.0 |
| S-657 | 0.03 | 30 | 6.0 |
| S-657 | 0.04 | 36 | 1.6 |
| S-657 | 0.05 | 40 | 0.0 |
| S-657 | 0.075 | 53 | 0.0 |
| S-657 | 0.10 | 63 | 0.0 |
| S-657 | 0.125 | 73 | 0.0 |
| S-657 | 0.150 | 84 | 0.0 |

[1]BWOW refers to basis weight of water
[2]FDR refers to Fann Dial Reading
[3]FW refers to free water These data demonstrate that S-657 is a surprisingly efficient rheological modifier of fresh cement paste. A sample containing only 0.03% S-657 produces 6% free (or bleed) water compared to 8.3% for the 0.075% K1C 376 welan sample. Thus, the welan produces more free water at over 1.5 times the concentration of S-657. Moreover, S-657 substantially eliminates free water when added at levels as low as only 0.05%, whereas 0.1% of welan is required to eliminate free water in the same cement paste.

EXAMPLE 2

Influence on Flow Time of Self-leveling Grouts

Proper rheological control is critical to the job design of self leveling grouts. While superplasticizers minimize interparticle friction and thus permit maximum flow, unfortunately, systems containing a superplasticizer in the absence of a water soluble polymer tend to segregate and bleed. The addition of water soluble polymers, however, tends to create excessive frictional forces and reduce grout flow. As a result, systems containing superplasticizers and water soluble polymers usually compromise flow and permit some sedimentation. In view of these problems with prior art grouts, grouts prepared according to the present invention, i.e., including S-657 and superplasticizers, provide maximum flow and eliminate sedimentation and bleed.

A particular advantage of S-657 relative to the prior art additive, welan gum, is the substantially improved time-dependent flow thereof. FIG. 1 shows the flow versus time for two polymers, i.e., S-657 and welan gum.

Thus, a model self-levelling mortar, similar to a floor compound, was used for the following tests. All proportions listed in the following formulation are quoted as percentages by weight.

| Model Self-levelling Mortar | |
|---|---|
| Ordinary Portland cement (conforming to BS12: 1991, class 42.5N) | 24.6% |
| Standard, Natural sand (conforming to BS 4550: part 5) | |
| 1.18 mm–600 µm | 22.7% |
| 600 µm–150 µm | 51.2% |
| Sulphonated melamine formaldehyde condensate superplasticizer | 1.5% |

The polysaccharide was thoroughly blended with the other dry materials prior to each test. Local tap water was added at 0.2 water/dry mix ratio. A defoamer was used at 0.054% by weight of dry mix.

Water at 20–25° C. was added and mixing conducted over three minutes using a Hobart N50 mixer fitted with a five litre bowl and "B" beater at setting two. The defoamer was added within the first minute of mixing.

Flow was assessed using a cone and flow table conforming to British Standard BS 6463. The mix was placed in the cone, levelled, and the cone lifted one minute after mixing was stopped. The material was allowed to reach maximum flow without disturbance. Flow was recorded as the mean of four (minimum) symmetrically distributed diameter measurements. This was repeated but the material was left in the cone for varying times prior to levelling the material and lifting the cone. Results are plotted in FIG. 1.

The data presented in FIG. 1 demonstrate that S-657 cement slurries exhibit surprisingly little time dependent loss in flow. This stability is especially dramatic when the performance of invention formulations is compared to the performance of cement formulations containing welan gum.

EXAMPLE 3

Performance in Oil Well Cement Slurries and Spacer Fluids

Oil well cement provides several functions including 1) sealing the steel casing to the surrounding formation; 2) providing mechanical support to the casing; and 3) protecting the steel casing from corrosion. See Smith, Dwight K., supra.

Oil well spacer fluids are used to enhance the removal of drilling mud from a formation, and to maintain separation between the cement slurry and the drilling mud. See Smith, Dwight K., supra.

Oil well cement may comprise the same range of materials listed previously. In addition, two Classes of portland cement are manufactured specifically for oil well applications, Class G and Class H.

Proper cementitious technique and job design provide the key to efficient oil well completion. A proper cement job forms a hydraulic seal with the subterranean formation, thus preventing reservoir fluids from entering the annulus and migrating to a lower pressure zone, or in extreme cases, all of the way to the surface. A less than ideal cement job may allow loss of hydrocarbons and in extreme cases, can lead to oil well fires. Once a steel pipe is lowered into the well bore, cement is pumped down this pipe, or so-called casing. The cement slurry is displaced up the formation casing annulus. Once in place, the slurry must effectively transmit sufficient hydrostatic pressure to prevent formation fluids from entering the well bore until the cement has sufficient strength to prevent fluid migration.

Efficient slurry placement requires rheological manipulation of both the spacer fluid and the cement slurry to provide a highly fluid system with minimal frictional pressure during placement. In addition, the spacer fluid and the cement slurry must resist water loss, or so called fluid loss, to the surrounding formation both during placement and in the static state. Once placed, this same slurry rheology must prevent particle sedimentation and free water formation. Slurries developing excessive frictional pressure during placement may cause premature job shutdown, or fracture the formation, either situation is highly undesirable. Should a cement slurry lose excessive water during placement, the particles may bridge and disrupt flow. After placement, fluid loss concentrates cement particles and can form particle bridges. Either condition may cause excessive hydrostatic pressure decay and lead to fluid migration.

S-657 and welan performance were compared in two class H oil well cement slurries mixed according to API Specification 10:

| SLURRY DESIGN (All additives are expressed in grams): | | |
|---|---|---|
| | TEST 1 | TEST 2 |
| Class H Cement | 859 | 791 |
| Water | 327 | 348 |
| Gum | 0.86 | 1.98 |
| Retarder | 4.3 | 7.91 |
| Temperature (° F.) | 185 | 185 |
| Dispersant | 8.6 | 7.9 |

Once slurries had conditioned in an atmospheric consistometer for 20 minutes at 185° F., three measurements were made. Initial Bearden units ($B_{ci}$), Bearden units after 20 minutes ($B_{c20}$) and API fluid loss (API FL; cm$^3$ in 30 minutes at 1000 psig), these data are listed in Table 2.

TABLE 2

S-657 performance in class H oil well cement slurries

| TEST | GUM | $B_{ci}^1$ | $B_{c20}^2$ | API FL$^3$ |
|---|---|---|---|---|
| 1 | S-657 | 9 | 11 | 106 |
| 1 | Welan | 6 | 9 | 167 |
| 2 | S-657 | 14 | 15 | 67 |
| 2 | Welan | 10 | 12 | 114 |

$^1B_{ci}$ refers to initial Bearden units
$^2B_{c20}$ refers to Bearden units after 20 minutes of conditioning
$^3$API FL refers to API fluid loss (in cm$^3$/30 min @ 1000 psig)

These data demonstrate that S-657 is superior to for fluid loss control at 185° F.

EXAMPLE 4

S-657 in Salt Water Class G Oil Well Cement Slurries

Salts are frequently encountered in oil well cementing. Low temperature designs frequently incorporate calcium chloride to accelerate strength development. In certain instances, salt formations are encountered and salt is added to the cement mix water to prevent dissolution of the salt formation. Proper job design of salt water slurries is extremely challenging because the majority of water soluble polymers do not function in this environment. S-657 provides surprising results in salt water cement systems as demonstrated in Table 3. The slurries employed for these tests were as follows:

| SLURRY DESIGN (all additives are expressed in grams): | | |
|---|---|---|
| | TEST 1 | TEST 2 |
| Class G Cement | 781 | 781 |
| Water | 348 | 348 |
| Salt | 16 g CaCl$_2$ | 35 g NaCl |
| Gum | 0.80 | 0.80 |
| Temperature (° F.) | 75 | 75 |
| Dispersant | 7.9 | 7.9 |

Once slurries had conditioned in an atmospheric consistometer for 20 minutes at 75° F., three measurements were made. Initial Bearden units, Bearden units after 20 minutes and API fluid loss (cm$^3$ in 30 minutes at 1000 psig)

TABLE 3

S-657 Performance in salt water class G cement slurries

| TEST | GUM | $B_{ci}^1$ | $B_{c20}^2$ | API FL$^3$ |
|---|---|---|---|---|
| 1 | S-657 | 10 | 10 | 173 |
| 1 | Welan | | slurry gelled - no data collected | |
| 2 | S-657 | 10 | 10 | 28 |
| 2 | Welan | 7 | 9 | 239 |

$^1B_{ci}$ refers to initial Bearden units
$^2B_{c20}$ refers to Bearden units after 20 minutes of conditioning
$^3$API FL refers to API fluid loss (in cm$^3$/30 min @ 1000 psig)

The data presented herein demonstrate that S-657 provides effective fluid loss control in salt water cement slurries. In contrast, the welan-containing formulation gelled the CaCl$_2$ cement slurry and resulted in excess fluid loss in the NaCl slurry.

EXAMPLE 5

S-657 Performance in Microfine Cement

The American Concrete Institute (ACI) Committee 552 has unofficially adapted a reference standard of 100% finer than 15 microns to be referred to as ultrafine. The term "ultrafine" is synonymous with "microfine" and "superfine" (Weaver, Ken, "Dam Foundation Grouting", Published by American Society of Civil Engineers, New York, N.Y., (1991)).

Nittetsu Super-Fine has a median particle size of 3 microns. Oneda manufactures a MC-500 with an average grain size of 4 microns. A number of additional reduced grain size cements includes, but is not limited to, Spinor A12, manufactured by CIMENTS D'ORIGNY, Paris, and MIKRODUR by Dykerhoff.

Microfine cement can provide excellent flow through a porous media and are frequently used to repair fissures, fill voids in soil, and reinforce or repair structures. Microfine cement particle size is typically less than 10 microns. These materials are several times more expensive and usually mixed at higher water cement ratios than portland cement. Particle sedimentation and free water cause a number of problems including heterogeneity and poor mechanical properties. S-657 provides enhanced performance as demonstrated by the results presented in Table 4. The base mixture employed contained 564 grams tap water and 113 grams of microfine cement. Dispersant is a sulfonated naphthalene.

Water and cement were mixed for 2 minutes at 4000 rpm in a Waring Blender. After the two minutes mix time, gum and dispersant were added and the cement grout mixed for an additional 3 minutes. Free water values are measured after 24-hours static in a sealed cylinder.

TABLE 4

Influence of K1C376, S-657, and superplasticizer on a microfine cement grout mixed at w/c = 5.0

| DISPERSANT (%, BWOC[1]) | GUM | GUM (%, BWOW[2]) | FDR[3] | FW[4] (%, Vol) |
|---|---|---|---|---|
| 0 | 0 | 0 | 7 | 42 |
| 2.0 | 0 | 0 | 5 | 81 |
| 3.0 | 0 | 0 | 3 | 87 |
| 2.0 | K1C376 | 0.05 | 10 | 3.0 |
| 2.0 | K1C376 | 0.10 | 18 | 0.5 |
| 2.0 | S-657 | 0.05 | 10 | 1.5 |
| 2.0 | S-657 | 0.10 | 18 | 0.1 |
| 3.0 | K1C376 | 0.05 | 11 | 1.9 |
| 3.0 | K1C376 | 0.10 | 18 | 0.4 |
| 3.0 | K1C376 | 0.20 | 43 | 0.0 |
| 3.0 | S-657 | 0.05 | 11 | 0.0 |
| 3.0 | S-657 | 0.10 | 19 | 0.0 |
| 3.0 | S-657 | 0.2 | 35 | 0.0 |

[1]BWOC refers to basis weight of cement
[2]BWOW refers to basis weight of water
[3]FDR refers to Fann Dial Reading
[4]FW refers to free water The results presented herein demonstrate that S-657 eliminates free water in highly fluid microfine cement slurries at surprisingly low concentrations.

EXAMPLE 6

S-657 Hydration Rate

The hydration rates of S-657 and K1C 376 were tested in a variety of cement formulations. Thus, 400 grams the desired cement sample were dry blended with 6 grams of a sulfonated naphthalene formaldehyde condensate superplasticizer, along with 0.4 grams of the desired polysaccharide gum. The dry blended mixture was then mixed with 400 grams of tap water for the desired time interval and tested. Test results are summarized in Table 5.

TABLE 5

Comparative Hydration Rates for K1C376 and S-657

| | S-657 | | K1C 376 | |
|---|---|---|---|---|
| CEMENT | $FDR_3$[a] | $FDR_{10}$[b] | $FDR_3$ | $FDR_{10}$ |
| 1 | 60 | 60 | 38 | 45 |
| 2 | 59 | 59 | 30 | 36 |
| 3 | 56 | 56 | 32 | 49 |
| 4 | 58 | 58 | 40 | 46 |
| 5 | 59 | 59 | 37 | 42 |
| 6 | 63 | 63 | 44 | 49 |

[a]$FDR_3$ refers to Fann Dial Reading after 3 min mixing
[b]$FDR_{10}$ refers to Fann Dial Reading after 10 min mixing Based on the viscosity obtained after mixing for 3 and 10 minutes, these data demonstrate that S-657 hydrates in less than three minutes. In contrast, K1C 376 samples show a significant viscosity increase after three minutes of mixing, indicating that the K1C 376 samples continue to hydrate well beyond the three minutes mix time.

These data also demonstrate that S-657 performance varies very little from cement sample to cement sample, while performance of K1C 376 is seen to vary to a much greater extent in the same cement samples.

In summary, S-657 is seen to provide enhanced rheological control in a variety of cementitious systems In addition, S-657 provides a number of advantages relative to prior art systems, including improved free water and sedimentation control, as well as reduced fines loss during underwater placement. This unique biogum has been shown to enhance the stability of highly diluted microfine cementitious systems, and enhance the flow and workability of super-workable and self-leveling pastes. The homogenous set cement resulting from the introduction of S-657 into cementitious systems promotes bond strength and eliminates the need for vibrated concrete. In addition, the presence of S-657 prevents excessive fines loss during underwater placement. Efficient free or bleed water control eliminates unsightly vugs or voids adjacent to the form work and thus enhances the appearance of the finished concrete. This highly efficient polymer provides additional benefits as well, such as, for example, enhanced color delivery in pigmented concrete and stabilized bubble entrapment in so called foamed or cellular cement systems. When used in sprayable cementitious systems, S-657 reduces rebound and sag. Yet another advantage of S-657 addition is the ability to control (or largely eliminate) washout of underwater concrete.

While the invention has been described in detail with reference to certain preferred embodiments thereof, it will be understood that modifications and variations are within the spirit and scope of that which is described and claimed.

That which is claimed is:

1. In a cementitious system containing one or more viscosity modifying agents, the improvement comprising including in said formulation a rheology improving amount of microbial polysaccharide S-657 and a dispersing agent.

2. A cementitious system according to claim 1 wherein said cementitious system is selected from portland cement, pozzolanic cement, slag cement, calcium aluminate cement, expanding cement, ceramic, a mud to cement system, or mixtures of any two or more thereof.

3. A cementitious system according to claim 1 wherein said viscosity modifying agent is selected from cellulose ethers, synthetic polymers, exopolysaccharides, marine gums, plant exudates, seed gums or starch-based gums.

4. A cementitious system according to claim 1 wherein a rheology improving amount of S-657 falls in the range of about 0.001 up to 1 wt %, based on the total weight of dry ingredients in said cementitious system.

5. A cementitious system according to claim 1 wherein a rheology improving amount of S-657 falls in the range of about 0.002 up to 0.5 wt. %, based on the total weight of dry ingredients in said cementitious system.

6. A novel formulation comprising:
a cementitious system,
a dispersing agent, and
microbial polysaccharide S-657.

7. A formulation according to claim 6 wherein said cementitious system is selected from portland cement, pozzolanic cement, slag cement, calcium aluminate cement, gypsum cement, expanding cement, microfine cement, colloidal cement, ceramic, a mud to cement system, or mixtures of any two or more thereof.

8. A formulation according to claim 6 wherein said cementitious system further comprises in the range of about 0.001 up to 3 wt % water, based on the total weight of dry ingredients in said formulation.

9. A formulation according to claim 6 wherein said cementitious system further comprisesin the range of about 0.002 up to 1 wt %, water, based on the total weight of dry ingredients in said formulation.

10. A method to improve the rheological properties of a cementitious system, said method comprising including in said system a rheology improving amount of microbial polysaccaride S-657 and a dispersing agent.

11. A method according to claim 10 wherein said rheology improving amount of S-657 falls in the range of about 0.001 up to 1 wt %, based on the total weight of dry ingredients in said cementitious system.

12. A method according to claim 10 wherein said rheology improving amount of S-657 falls in the range of about 0.003 up to 0.5 wt %, based on the total weight of dry ingredients in said cementitious system.

13. In a self-leveling grout formulation, the improvement comprising adding to said formulation a rheology improving amount of microbial polysacarride S-657 and a dispersing agent.

14. A formulation according to claim 13 wherein said rheology improving amount of S-657 falls in the range of about 0.001 up to 0.5 wt %, based on the total weight of dry ingredients in said grout formulation.

15. A formulation according to claim 13 wherein said rheology improving amount of S-657 falls in the range of about 0.002 up to 0.15 wt. %, based on the total weight of dry ingredients in said grout formulation.

16. A method for reducing bleed and sedimentation in cement formulations selected from grout, mortar or concrete formulations, said method comprising adding to said formulation microbial polysaccaride S-657 and a dispersing agent.

17. A method according to claim 16 wherein said rheology improving amount of S-657 falls in the range of about 0.002 up to 0.5 wt. %, based on the total weight of dry ingredients in said cement formulations.

18. A method to improve the performance of a fresh or saltwater oil well cement slurries, said method comprising adding to said slurry a rheology improving amount of microbial polysaccaride S-657 and a dipersing agent.

19. A method according to claim 18 wherein said rheology improving amount of S-657 falls in the range of about 0.01 up to 0.5 wt %, based on the total weight of dry ingredients in said cement slurries.

20. A modified fresh or saltwater oil well cement slurry comprising a fresh or saltwater oil well cement slurry, and microbial polysaccaride S-657 and a dispersing agent.

21. A slurry according to claim 20 wherein said rheology improving amount of S-657 falls in the range of about 0.01 up to 0.5 wt %, based on the total weight of dry ingredients in said cement slurry.

22. In a microfine cement formulation containing one or more dispersants, the improvement comprising adding to said formulation a rheology improving amount of microbial polysaccaride S-657.

23. A formulation according to claim 22 wherein said rheology improving amount of S-657 falls in the range of about 0.01 up to 5 wt %, based on the total weight of dry ingredients in said cement formulation.

24. A formulation according to claim 22 wherein said rheology improving amount of S-657 falls in the range of about 0.01 up to 5 wt %, based on the total weight of dry ingredients in said cement formulation.

25. A method to improve the rheological properties of a colloidal cement, said method comprising adding to said cement a rheology improving amount microbial polysaccaride S-657 and a dispersing agent.

26. A method according to claim 25 wherein said rheology improving amount of S-657 falls in the range of about 0.001 to 0.5 wt %, based on the total weight of water.

27. In a cementitious system containing one or more viscosity modifying agents, the improvement comprising including in said system a rheology improving amount of microbial polysaccharide S-657 and a dispersing agent.

28. A method to improve the reheological properties of a cementitious system, said method comprising including in said system a rheology improving amount of microbial polysaccharide S-657 and a dispersing agent.

29. In a highly flowable, self-leveling grout formulation, the improvement comprising adding to said formulation a rheology improving amount of microbial polysaccharide S-657 and a dispersing agent.

30. A method to improve the performance of fresh or saltwater oil well cement slurries, said method comprising adding to said slurry a rheology improving amount of microbial polysaccharide S-657 and a dispersing agent.

31. A modified fresh or saltwater oil well cement slurry comprising: a fresh or saltwater oil well cement slurry, and a microbial polysaccharide microbial polysaccharide S-657 and a dispersing agent.

32. In a microfine cement formulation containing one or more dispersants, the improvement comprising adding to said formulation a rheology improving amount of microbial polysaccharide S-657 and a dispersing agent.

33. A method to improve the rheological properties of colloidal cement, said method comprising adding to said cement a rheology improving amount of a microbial polysaccharide S-657 and a dispersing agent.

34. A novel formulation comprising a cementitious system, and a microbial polysaccharide S-657 and a dispersing agent.

* * * * *